US009857061B1

(12) United States Patent
Deng

(10) Patent No.: US 9,857,061 B1
(45) Date of Patent: Jan. 2, 2018

(54) PROJECTOR OF DECORATIVE LIGHTS

(71) Applicant: E. Mishan & Sons, Inc., New York, NY (US)

(72) Inventor: Daniel Deng, Dongguan (CN)

(73) Assignee: E. Mishan & Sons, Inc., New York, NY (US)

( * ) Notice: Subject to any disclaimer, the term of this patent is extended or adjusted under 35 U.S.C. 154(b) by 0 days.

(21) Appl. No.: 15/675,036

(22) Filed: Aug. 11, 2017

(51) Int. Cl.

| | |
|---|---|
| ***F21V 17/02*** | (2006.01) |
| ***F21V 15/01*** | (2006.01) |
| ***G03B 21/14*** | (2006.01) |
| ***F21V 21/15*** | (2006.01) |
| ***F21V 21/30*** | (2006.01) |
| ***H05B 37/02*** | (2006.01) |
| *F21S 10/02* | (2006.01) |

(52) U.S. Cl.
CPC .............. *F21V 15/01* (2013.01); *F21V 17/02* (2013.01); *F21V 21/15* (2013.01); *F21V 21/30* (2013.01); *H05B 37/0245* (2013.01); *F21S 10/02* (2013.01)

(58) Field of Classification Search
CPC .......... F21V 15/01; F21V 17/02; F21V 21/15; F21V 21/30; G03B 21/142; G03B 21/145; G03B 21/2033; G03B 21/562; G03B 21/602
See application file for complete search history.

(56) References Cited

U.S. PATENT DOCUMENTS

| | | | | |
|---|---|---|---|---|
| 2,608,779 A | 9/1952 | Joy | | |
| 3,531,636 A | 9/1970 | Birch | | |
| 3,634,679 A | 1/1972 | Krzyston | | |
| 3,755,664 A | 8/1973 | Reiback | | |
| 3,760,176 A | 9/1973 | Trop | | |
| 3,949,350 A | 4/1976 | Smith | | |
| 4,107,764 A | 8/1978 | Riley | | |
| 4,249,331 A | 2/1981 | Vernon | | |
| 4,847,739 A | 7/1989 | Saraceni | | |
| 4,999,060 A | 3/1991 | Szekely et al. | | |
| 5,055,984 A | 10/1991 | Hung et al. | | |
| 5,062,028 A | 10/1991 | Frost et al. | | |
| 5,241,418 A | 8/1993 | Doak | | |
| D441,116 S | 4/2001 | Sanoner | | |
| 6,471,370 B2 | 10/2002 | Schleifer | | |
| D471,223 S | 3/2003 | Whitney | | |
| 6,563,269 B2 | 5/2003 | Robinett et al. | | |
| 6,714,349 B2 * | 3/2004 | Nam | G03B 21/602 | 359/457 |

(Continued)

*Primary Examiner* — Alan Cariaso

(74) *Attorney, Agent, or Firm* — Notaro, Michalos & Zaccaria P.C.

(57) ABSTRACT

A projector for projecting moving decorative lights has a back housing containing a transparent lens sphere with an array of lens, rotating on an axis in the back housing, a motor in the back housing, entirely rearward of the sphere axis, a gear train chassis carrying the motor, mounted to the back housing and extending to the sphere axis, a gear train on the chassis rotates the lens sphere slowly compared to the motor, a post fixed to the back housing and extending into the lens sphere, a circuit and LED board fixed to the post, having at least one LED activated to cast light through the lenses, the light being projected to a plurality of locations and moving as the lens sphere rotates, a front housing covering a front end of the back housing and a stand for supporting the projector.

18 Claims, 3 Drawing Sheets

(56) References Cited

U.S. PATENT DOCUMENTS

| | | | |
|---|---|---|---|
| D496,483 S | 9/2004 | Christianson | |
| 7,033,037 B2 | 4/2006 | Chen | |
| 7,182,472 B2 * | 2/2007 | Vitantonio | F16M 11/10 353/99 |
| 7,210,816 B2 | 5/2007 | Lin | |
| D547,899 S | 7/2007 | VanderSchuit | |
| 7,473,002 B1 | 1/2009 | Chen | |
| 7,661,838 B2 | 2/2010 | Chen | |
| 7,784,959 B2 | 8/2010 | Yang | |
| 8,007,134 B2 | 8/2011 | Allegri | |
| 8,602,585 B1 | 12/2013 | Lowe et al. | |
| 8,695,247 B1 | 4/2014 | Yang | |
| 8,915,607 B2 | 12/2014 | Yang | |
| 9,013,775 B2 | 4/2015 | Dear | |
| 9,068,726 B2 | 6/2015 | Zhang | |
| 9,115,856 B1 | 8/2015 | Robinson | |
| 9,121,559 B2 | 9/2015 | Johnson et al. | |
| 9,122,136 B2 | 9/2015 | Tang | |
| 9,267,660 B1 | 2/2016 | Wang | |
| 9,310,059 B2 | 4/2016 | Zhang | |
| 9,395,061 B2 | 7/2016 | Yang | |
| 9,453,626 B2 | 9/2016 | Ruiz Bonet | |
| 9,504,101 B2 | 11/2016 | Zhang | |
| 9,551,472 B2 | 1/2017 | Ding | |
| 9,632,214 B2 | 4/2017 | Streppel et al. | |
| 9,664,373 B2 | 5/2017 | Zhang | |
| D790,100 S | 6/2017 | Jadhav | |
| D791,381 S | 7/2017 | Chang et al. | |
| 9,696,025 B2 | 7/2017 | Zhang | |
| 2005/0103378 A1 | 5/2005 | Pu et al. | |
| 2007/0097681 A1 | 5/2007 | Chich et al. | |
| 2008/0151545 A1 | 6/2008 | Kratz | |
| 2010/0091479 A1 | 4/2010 | Martin | |
| 2010/0277900 A1 | 11/2010 | Cohen | |
| 2014/0227940 A1 | 8/2014 | Jones | |
| 2015/0211701 A1 | 7/2015 | Chien | |
| 2017/0038031 A1 | 2/2017 | Chien | |
| 2017/0175963 A1 | 6/2017 | Lentine et al. | |
| 2017/0175993 A1 | 6/2017 | Fornataro | |
| 2017/0193867 A1 | 7/2017 | Ku et al. | |
| 2017/0219176 A1 * | 8/2017 | Chang | F21K 9/90 |

* cited by examiner

PROJECTOR OF DECORATIVE LIGHTS

FIELD AND BACKGROUND OF THE INVENTION

The present invention relates generally to the field of decorative lighting, and in particular to a new and useful projector for projecting an array of moving decorative lights.

Outdoor projectors for projecting an array of decorative holiday lights onto a surface are known, for example, from U.S. Pat. No. 8,100,537 which discloses a laser landscape lighting apparatus that uses a rotating diffraction grating wheel to split the laser light into a moving star field of lights on the surface.

A need remains for a decorative light projector that has a similar effect of casting an array of decorative moving lights on a surface, but which uses less expensive and lower heat producing LEDs, rather than lasers.

SUMMARY OF THE INVENTION

It is an object of the present invention to provide a projector for projecting moving decorative lights that has a back housing containing a transparent lens sphere with an array of lens and rotating on an axis in the back housing, a motor in the back housing, entirely rearward of the sphere axis, a gear train chassis carrying the motor, mounted to the back housing and extending to the sphere axis, a gear train on the chassis rotates the lens sphere slowly compared to the motor, a post fixed to the back housing and extending into the lens sphere, a circuit and LED board fixed to the post, having at least one LED activated to cast light through the lenses, the light being projected to a plurality of locations and moving as the lens sphere rotates, a front housing covering a front end of the back housing and a stand for supporting the projector.

By placing the motor rearwardly of the lens sphere axis, the weight of the apparatus is better balanced and the water-sensitive motor is placed further back in the back housing, away from the partition plane between the back and front housings where water is most likely to penetrate the housing.

Accordingly, another object of the invention is to provide a projector apparatus for projecting an array of decorative lights which comprises a back housing having a closed rear and an open front end, a transparent lens sphere mounted for rotation on a sphere axis in the back housing, the lens sphere having an array of convex lenses along its surface, a motor in the back housing, entirely rearward of the sphere axis, a gear train chassis mounted to and in the back housing and extending at least from the motor to the sphere axis, the motor being mounted to the chassis, a gear train comprising three or more meshed together gears each mounted for rotation to the chassis, between the motor and the lens sphere, for rotating the lens sphere relatively slowly as compared to a rotation rate of the motor, a post fixed to and in the back housing and extending into the lens sphere, a circuit board fixed to the post, at least one LED board fixed to circuit board and having at least one LED connected thereto and electrically connected to the circuit board to be activated by the circuit board to cast light through the plurality of the convex lenses, the light being projected into an array of decorative lights that move as the lens sphere rotates, a front housing connected to the back housing and covering the open front end of the back housing, the front housing being at least partly transparent to pass light from each LED, and a stand connected to the back housing for supporting the projector apparatus.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
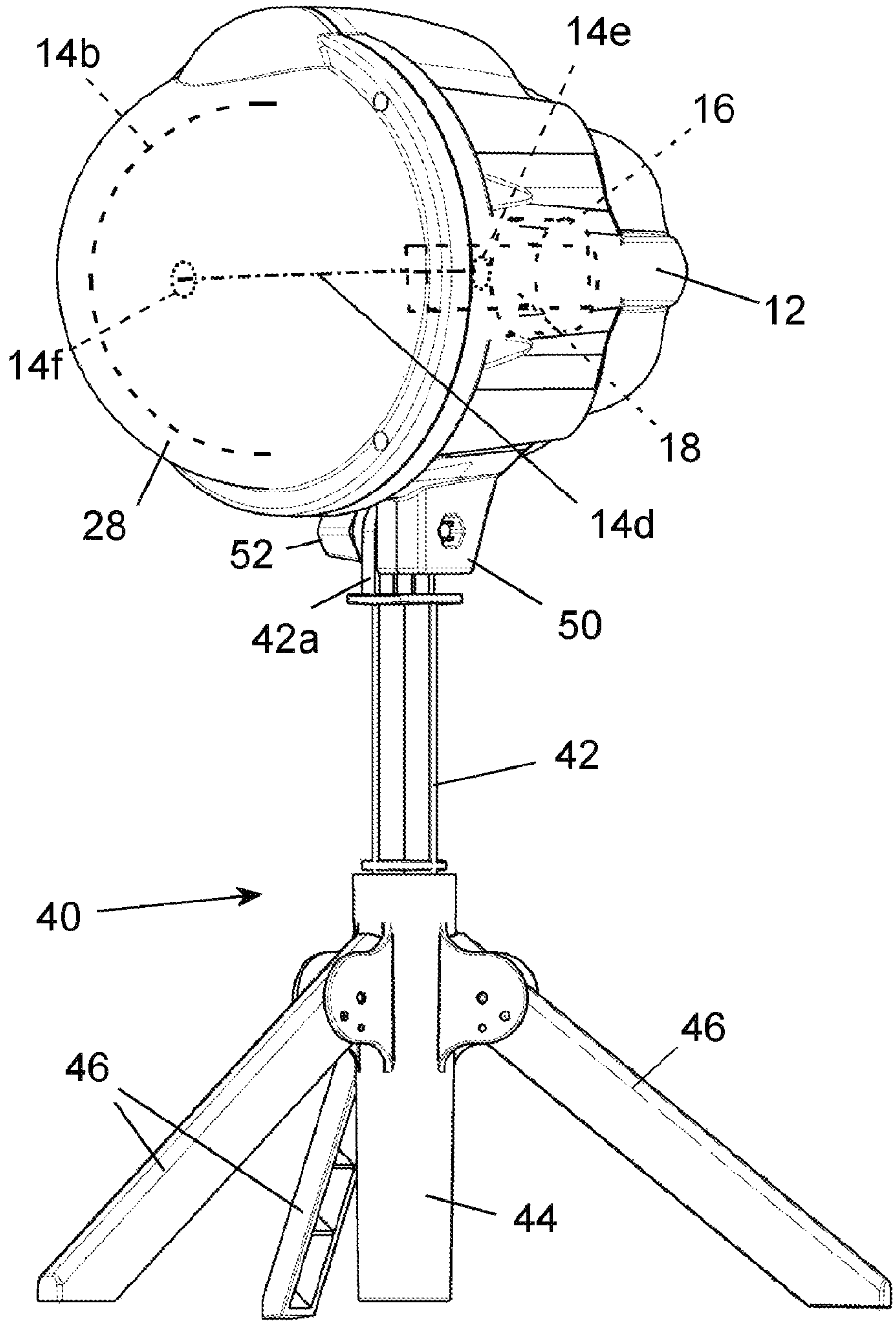
FIG. 1 is a front perspective view of the projector apparatus of the invention.

Referring now to the drawings, in which like reference numerals are used to refer to the same or similar elements, FIG. 1 shows the projector apparatus for projecting an array of decorative lights of the invention, which comprises a back housing 12 having a closed rear and open front end, and a mostly or entirely transparent front housing 28 connected to the back housing 12 and covering the open front end of the back housing. By being at least partly transparent, the front housing 28 passes light from LEDs inside the housing, out through the open front housing of the apparatus. A transparent lens sphere, half of which is visible at 14*b* in FIG. 1, is mounted for slow rotation in the housing 12, 28, on a pair of aligned journal holes 14*e* and 14*f* that contain rotation journal, and around a sphere axis 14*d* in the housing, the lens sphere having an array of convex lenses 14*c* visible in FIG. 2, that are contiguous and along an inner surface of the sphere.

Figure 2:
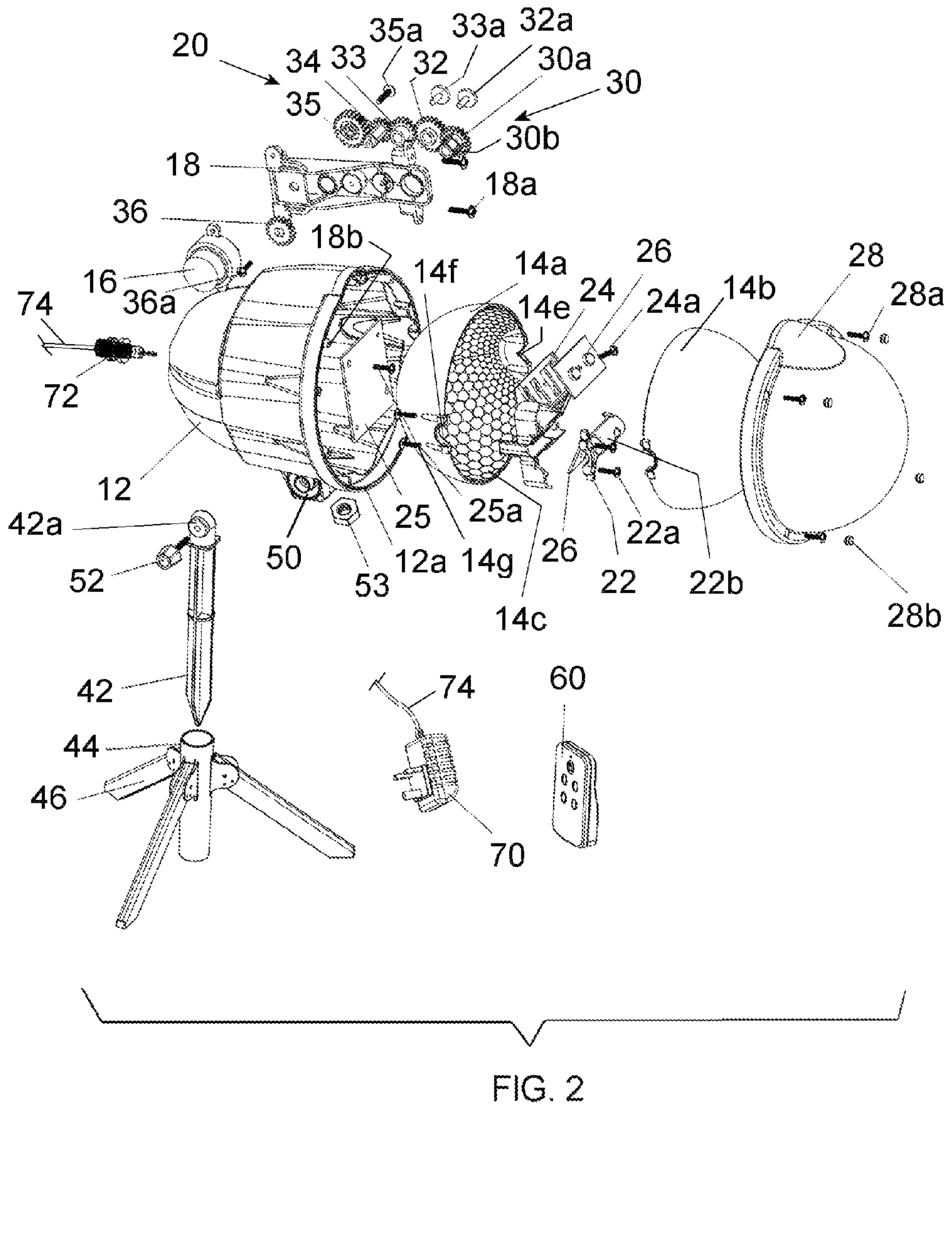
FIG. 2 is an exploded view of the apparatus, including also a plug-in power converter and remote control therefore.
Figure 3:
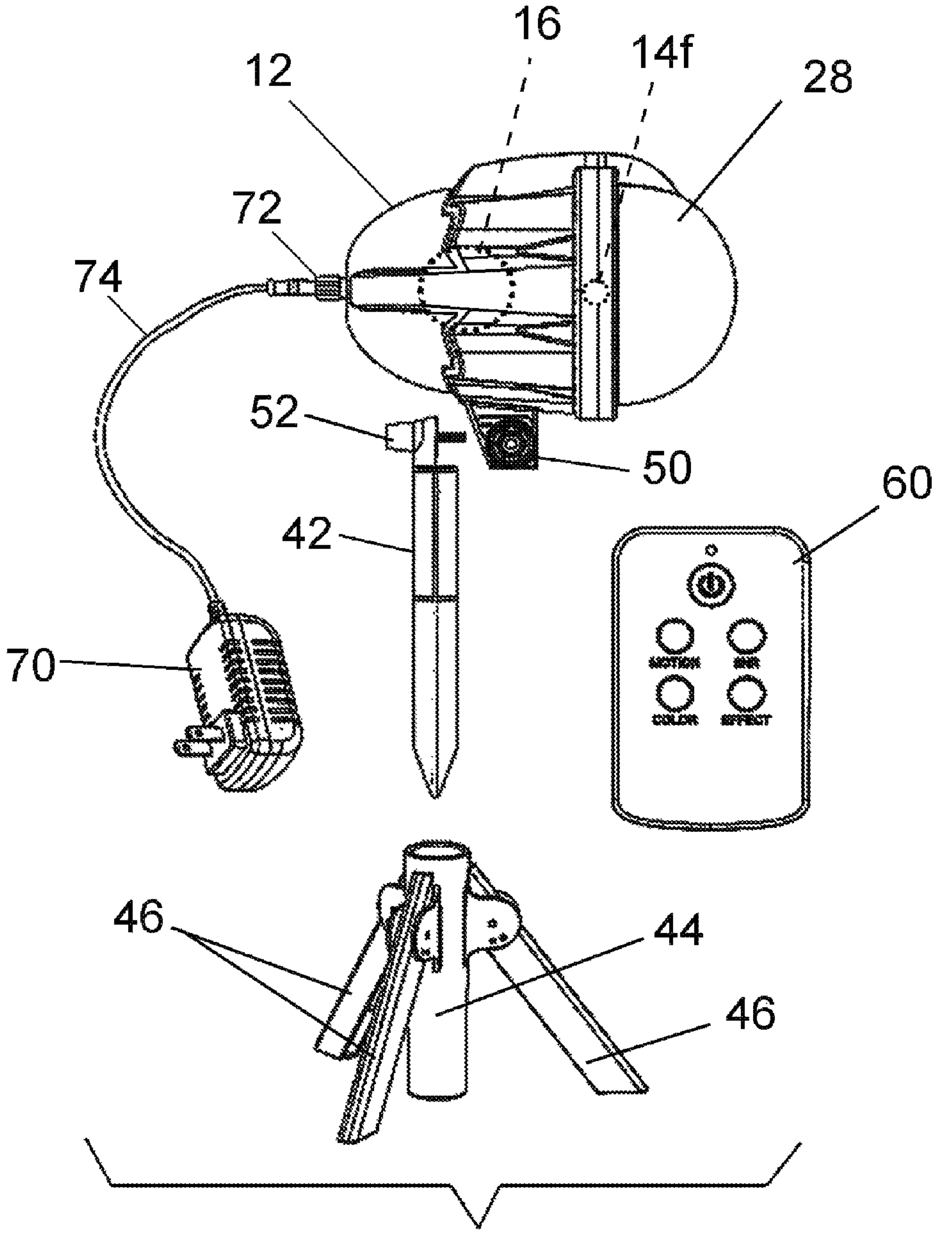
FIG. 3 is a further exploded view of the apparatus showing the major components of the apparatus.

With references to FIGS. 1, 2 and 3, the apparatus includes an electric motor 16, disposed in the back housing 12, entirely rearward of the sphere axis 14*d* and journal holes 14*e* and 14*f*. This placement of this relatively heavy component has been found to improve the weight distribution balance of the apparatus. This placement of the water-sensitive motor further back in the back housing 12 and away from the partition plane between the back and front housings 12, 28, where water is most likely to penetrate the housing, is another advantage. To help limit or eliminate any water penetration, however, a seal 12*a* is provided between housing parts 12 and 28 and these parts are connected together with screws 28*a*. Rubber stoppers 28*b* are plugged into recesses in front housing 28, and cover the head of each screw 28*a* for an clean esthetic appearance of the projector.

A gear train chassis 18 is mounted in and to the back housing 12 by screws 18*a* threaded into the bores of suitably provided posts 18*b* molded into the plastic of the back housing 12. The gear trains chassis 18 extends at least from the motor 16 to the sphere axis 14*d*, the motor being mounted to the chassis by screws. A gear train 20 comprising a plurality of meshed together gears each mounted for rotation to the chassis, is provided between the motor and the lens sphere, for rotating the lens sphere relatively slowly as compared to a rotation rate of the motor 16.

A post 22 is fixed in and to the back housing 12 by screws 22*a* threaded into other bores molded into the back housing, and has a journal portion 22*b* that extends into one of the journal holes of the lens sphere to act as one of the two needed rotation supports for the sphere in the housing. A main circuit board 25 is mounted by screws 25*a* in the back housing 12, behind the lens sphere, for receiving power from a connector 72, a wire 74 and a power converter 70 adapted to be plugged into a wall receptacle. Internal wires (not shown) extend through the interior of post 22, from the main board 25 to a further circuit board 24 that is fixed by screw 25*a* to the post 22, for sending power and signals to the circuit board 24.

At least one but preferably two LED boards 26 are fixed to the circuit board 24 and each have at least one but preferably two mono- or multi-colored LEDs fixed thereto and electrically connected to the circuit board 24 to be activated by the circuit board to cast light through the plurality of the convex lenses 14*c*, the light being projected into an array of decorative lights that move as the lens sphere slowly rotates.

A stand 40 is connected to the back housing 28 for supporting the projector apparatus. The stand comprises a spike 42 connected to the back housing 12 that can be inserted into the ground directly, a studdle 44 having a hollow portion for receiving and supporting the spike if the apparatus is just to rest on a flat surface like the ground, and a plurality of legs 46 pivotally connected to the studdle 44 for supporting the studdle and spike on the ground. An upwardly extending ear 42*a* of the spike 42, engages against a downward projection 50 molded as part of the back housing and is held in place by a threaded knob 52, threaded to a nut 53 that is captured in the projection 50. In this way the housing can be angled to cast its light array in any desired direction, against walls in an interior room, or against the outside surfaces of a home or other building, for example.

The LEDs are activated by a remote control 60 having a button that turns the apparatus on and off, another button that starts and stops the rotation of the lens sphere, another that scrolls through multiple colors and color combinations of the light being emitted and another that selects flashing or twinkling effects for the light.

The lens sphere includes halves 14*a* and 14*b* that are connected to each other with screws 14*g*. Semicircular recesses 14*e* and 14*f* in the separation plane between the sphere halves together form the two journal holes on opposite sides of the lense sphere, with the hole at 14*f* receiving the journal portion 22*b* of post, and the hole at 14*e* receiving a journal portion 30*b* of a first gear 30 of the gear train 20. First gear 30 includes a toothed wheel 30*a* that meshes with the next or second gear 32 in the train.

Gear train 20 also included a third gear 33 meshed with gear 32, gears 32 and 33 being mounted for rotation on chassis 18 by gear shafts 32*a* and 33*a* respectively. A fourth gear 34, meshed with gear 33, is rotatable mounted to chassis 18 by a screw 36*a* that also connected a fifth gear 36 to the fourth gear 34. Fifth gear 36 is meshed with a motor gear 35 that is fixed to the shaft of motor 16 by a screw 35*a* to complete the gear train.

While a specific embodiment of the invention has been shown and described in detail to illustrate the application of the principles of the invention, it will be understood that the invention may be embodied otherwise without departing from such principles.

What is claimed is:

1. A projector apparatus for projecting an array of decorative lights, comprising:

a back housing (12) having a closed rear and an open front end;

a transparent lens sphere (14*a*, 14*b*) mounted for rotation on a sphere axis (14*d*) in the back housing, the lens sphere having an array of convex lenses (14*c*) along its surface;

a motor (16) in the back housing, entirely rearward of the sphere axis;

a gear train chassis (18) mounted in and to the back housing (12) and extending at least from the motor to the sphere axis, the motor being mounted to the chassis;

a gear train (20) comprising a plurality of meshed together gears each mounted for rotation to the chassis, between the motor and the lens sphere, for rotating the lens sphere relatively slowly as compared to a rotation rate of the motor;

a post (22) fixed in and to the back housing (12) and extending into the lens sphere;

a circuit board (24) fixed to the post;

at least one LED board (26) fixed to circuit board and having at least one LED connected thereto and electrically connected to the circuit board to be activated by the circuit board to cast light through a plurality of the convex lenses, the light being projected into an array of decorative lights that move as the lens sphere rotates;

a front housing (28) connected to the back housing (12) and covering the open front end of the back housing, the front housing being at least partly transparent to pass light from each LED; and a stand (40) connected to the back housing for supporting the projector apparatus.

2. The projector apparatus of claim 1, wherein the gear train (20) includes at least three meshed gears for reducing the rotation rate of the motor to the slower rotation rate of the lens sphere.

3. The projector apparatus of claim 1, wherein the array of convex lenses (14*c*) are contiguous with each other and cover an inner surface of the lens sphere.

4. The projector apparatus of claim 1, including two LED boards connected at an angle to each other to the circuit board, each LED having at least two LEDs.

5. The projector apparatus of claim 1, wherein the gear train includes one journal gear (30) having a gear portion (30*a*) messed with another gear (32) in gear train (20) and a journal portion (30*b*) extending in an opening (14*e*) in the lens sphere and cooperating with the post (22) which extends in an opposite opening (14*f*) in the lens sphere, to act as bearings for rotation of the lens sphere on the sphere axis (14*d*).

6. The projector apparatus of claim 1, wherein the gear train includes at least six meshed gears.

7. The projector apparatus of claim 1, wherein the stand (40) includes a spike connected to the back housing (12) for supporting the apparatus if the spike is inserted into the ground, a studdle (44) having a hollow portion for receiving and supporting the spike, and a plurality of legs (46) pivotally connected to the studdle for supporting the studdle and spike on the ground.

8. A projector for projecting moving decorative lights, comprises:

back housing;

a transparent lens sphere with an array of lens, rotating on an axis in the back housing;

a motor in the back housing, entirely rearward of the sphere axis;

a gear train chassis carrying the motor, mounted in the back housing and extending at least to the sphere axis;

a gear train mounted to the chassis for rotating the lens sphere relatively slowly as compared to a rotation rate of the motor;

a post fixed to the back housing and extending into the lens sphere;

a circuit board fixed to the post;

at least one LED board fixed to circuit board and having at least one LED, electrically connected to the circuit board to be activated by the circuit board to cast light through the lenses, the light being projected to a plurality of locations and moving as the lens sphere rotates;

a front housing covering an open front end of the back housing; and a stand connected to the back housing for supporting the projector.

9. The projector apparatus of claim 8, wherein the gear train includes at least three meshed gears for reducing the rotation rate of the motor to the slower rotation rate of the lens sphere.

10. The projector apparatus of claim 8, wherein the array of convex lenses are contiguous with each other and cover an inner surface of the lens sphere.

11. The projector apparatus of claim 8, wherein the gear train includes one journal gear having a gear portion messed with another gear in gear train and a journal portion extending in an opening in the lens sphere and cooperating with the post which extends in an opposite opening in the lens sphere, to act as bearings for rotation of the lens sphere on the sphere axis.

12. The projector apparatus of claim 8, including two LED boards connected at an angle to each other to the circuit board, each LED having at least two LEDs.

13. The projector apparatus of claim 8, wherein the stand includes a spike connected to the back housing for supporting the apparatus if the spike is inserted into the ground, a studdle having a hollow portion for receiving and supporting the spike, and a plurality of legs pivotally connected to the studdle for supporting the studdle and spike on the ground.

14. A projector for projecting moving decorative lights, comprises:

a housing containing a transparent lens sphere with an array of lens, rotating on an axis in the housing;

a motor in the housing, entirely rearward of the sphere axis;

a gear train chassis carrying the motor, mounted to the housing and extending to the sphere axis;

a gear train on the chassis rotating the lens sphere slowly compared to the motor;

a post fixed to the housing and extending into the lens sphere;

a circuit and LED board fixed to the post, having at least one LED activated to cast light through the lenses, the light being projected to a plurality of locations and moving as the lens sphere rotates;

a front covering a front end of the housing; and a stand for supporting the projector.

15. The projector apparatus of claim 14, wherein the gear train includes at least three meshed gears for reducing the rotation rate of the motor to the slower rotation rate of the lens sphere.

16. The projector apparatus of claim 14, wherein the gear train includes one journal gear having a gear portion messed with another gear in gear train and a journal portion extending in an opening in the lens sphere and cooperating with the post which extends in an opposite opening in the lens sphere, to act as bearings for rotation of the lens sphere on the sphere axis.

17. The projector apparatus of claim 14, including two LED boards connected at an angle to each other to the circuit board, each LED having at least two LEDs.

18. The projector apparatus of claim 14, wherein the stand includes a spike connected to the back housing for supporting the apparatus if the spike is inserted into the ground, a studdle having a hollow portion for receiving and supporting the spike, and a plurality of legs pivotally connected to the studdle for supporting the studdle and spike on the ground.

* * * * *